July 21, 1925.

A. LONGLEY

ADJUSTABLE SHACKLE BOLT

Filed March 13, 1924

1,546,668

INVENTOR.
AUSTIN LONGLEY.
By Fetherstonhaugh & Co.
ATTYS.

Patented July 21, 1925.

1,546,668

UNITED STATES PATENT OFFICE.

AUSTIN LONGLEY, OF ST. CATHARINES, ONTARIO, CANADA.

ADJUSTABLE SHACKLE BOLT.

Application filed March 13, 1924. Serial No. 699,083.

*To all whom it may concern:*

Be it known that I, AUSTIN LONGLEY, a subject of the King of Great Britain, and a resident of the city of St. Catharines, in the county of Lincoln, in the Province of Ontario, Canada, have invented certain new and useful Improvements in Adjustable Shackle Bolts, of which the following is the specification.

My invention relates to improvements in universal thrust bearings, and the object of the invention is to devise means for tightening up members connected by a bolt should they wear loose, and thus eliminate the consequent rattle when under vibration so frequently objectionable in shackle bolts of automobiles, and it consists essentially of a bolt extending through a pair of inter-engaging members adapted to be connected together thereby, a sleeve loosely mounted upon the bolt and having internally tapered or conical ends, such sleeve being located within the inner inter-engaging member, a pair of opposing conical members carried by the bolt and adjustably carried by the outer inter-engaging member at each side of the inner inter-engaging member, the parts being arranged and constructed as hereinafter more particularly described.

In the drawings like characters of reference indicate corresponding parts in each figure.

Figure 1:
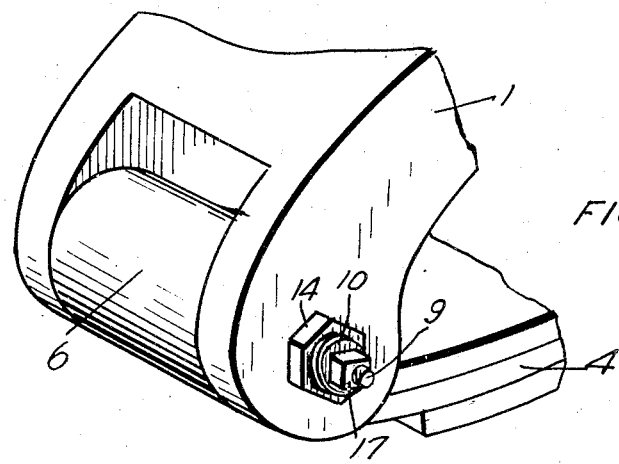
Fig. 1 is a perspective view of my device applied to an automobile shackle bolt.
Figure 2:
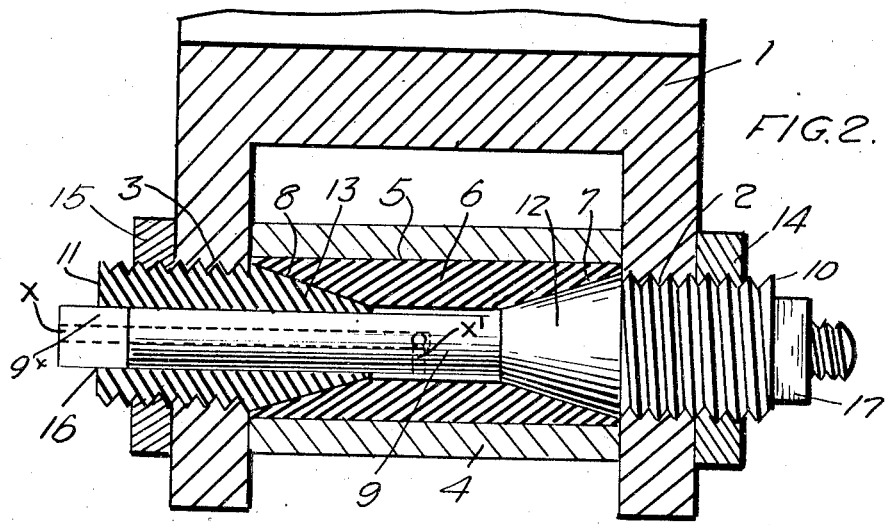
Fig. 2 is a sectional view through my device, as illustrated in Fig. 1, extending longitudinally of the bolt, showing one conical member in full.
Figure 3:
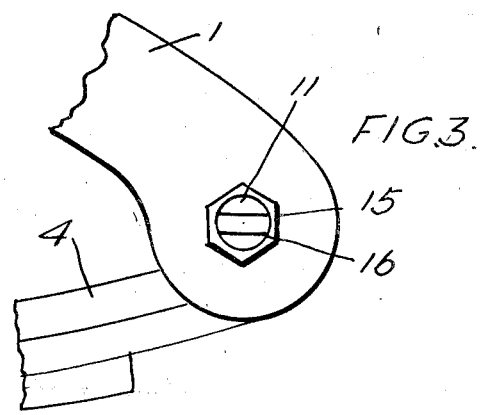
Fig. 3 is a side elevation of my device looking to the opposite side of the view showing Fig. 1.

1 indicates the rear end of a channel bar of usual construction forming the longitudinal member of the chassis frame, having aligned orifices 2 and 3 in the flanges of the bar between which fits the end of an automobile spring 4 having an orifice 5 through which, and the orifices 2 and 3, the ordinary shackle bolt of an automobile extends. The channel bar 1 and spring 4 form two inter-engaging members adapted to be connected together by the shackle bolt, as hereafter described. In my construction the orifice 5 is enlarged and the orifices 2 and 3 internally threaded.

6 is a sleeve fitting within the enlarged orifice 5 of the spring 4, and having internally tapered or conical ends 7 and 8. 9 is a bolt which extends longitudinally loosely through the sleeve 6 and through the orifices 2 and 3.

10 and 11 are externally threaded cylindrical members screwed into the internally threaded orifices 2 and 3 and provided at their inner opposing ends with conical or tapered headed portions 12 and 13 fitting within the tapered ends 7 and 8 of the sleeve 6. The members 10 and 11 project outward from each side of the channel bar 1 and are provided with locking nuts 14 and 15. The member 11 is provided at its outer end with a diametric recess 16 into which the flattened head 9ˣ of the bolt 9 fits. The opposite end of the bolt is provided with a locking nut 17.

Having described the principal parts involved in my invention I will now briefly describe the operation of the same.

It will of course be understood that by my construction the surfaces subject to wear by the movement of the spring 4 will be the outer peripheries of the heads 12 and 13 which support the spring, therefore there will be no wear from this cause on the bolt, any looseness occurring between the heads 12 and 13 and the spring.

In order to adjust my device the nut 17 and the lock nuts 14 and 15 are loosened, a wrench is applied to the projecting left hand end of the bolt 9, which fits in the rectangular cross recess in the outer end of the member 11, and the outer end of the member 10 is also gripped by a wrench and the parts turned so that the cone portions 12 and 13 are carried inward. If the threaded outer end of the part 10 does not provide sufficient gripping surface for the wrench, the opposite side of such threaded portions might be flattened in order to give the desired grip. The end of the bolt 9 being flattened permits of this bolt being gripped by the wrench and fitting within the cross groove of the part 11 permits of such part 11 being turned when the bolt is turned by the wrench so as to provide for the necessary adjustment.

Although I have described my device as applied particularly to shackle bolts of an automobile, it will of course be understood that it may be applied to any bolt connecting two inter-engaging members together which is liable to wear loose and in which it is necessary to take up the wear so as to avoid the rattle of the bolt in the worn orifice.

When small bolts are used, the member 11 and the head 13 may form an integral part of the bolt 9 instead of being formed separately therefrom, as shown in the drawing, an oil hole $x$ extending longitudinally of the bolt to feed oil to a perforation $x^1$ and into the interior of the bearing.

From this description it will be seen that I have devised a very simple device whereby the wearing of the bolt is prevented within the orifices of two inter-engaging members, and any looseness between such members taken up so as to avoid any rattling of the bolt when subjected to vibration.

What I claim as my invention is:

In a shackle construction, the combination with two opposing side members having internally threaded orifices, of a leaf spring having a sleeved end insertible between the aforesaid members and in align with the aforesaid internally threaded orifices, a bearing sleeve having outwardly flaring internal ends fitting within the sleeve of the spring, threaded members screwed into the internally threaded orifices and having conical inner ends fitting into the flaring ends of the bearing sleeve, a jam nut threaded upon each threaded member against the outer face of each forked arm, and a bolt having an unthreaded portion extending freely through the aforesaid conical ended threaded members and the bearing sleeve to hold such members together against each end of the bearing sleeve and provided at one end with a head bearing against the outer end of one threaded member, and a nut screwed on to the opposite end bearing against the outer end of the other threaded member.

AUSTIN LONGLEY.